March 12, 1935. R. H. HIMES 1,993,785
METHOD OF AND APPARATUS FOR CONTROLLING THE CHARGING OF STORAGE BATTERIES
Filed April 27, 1929
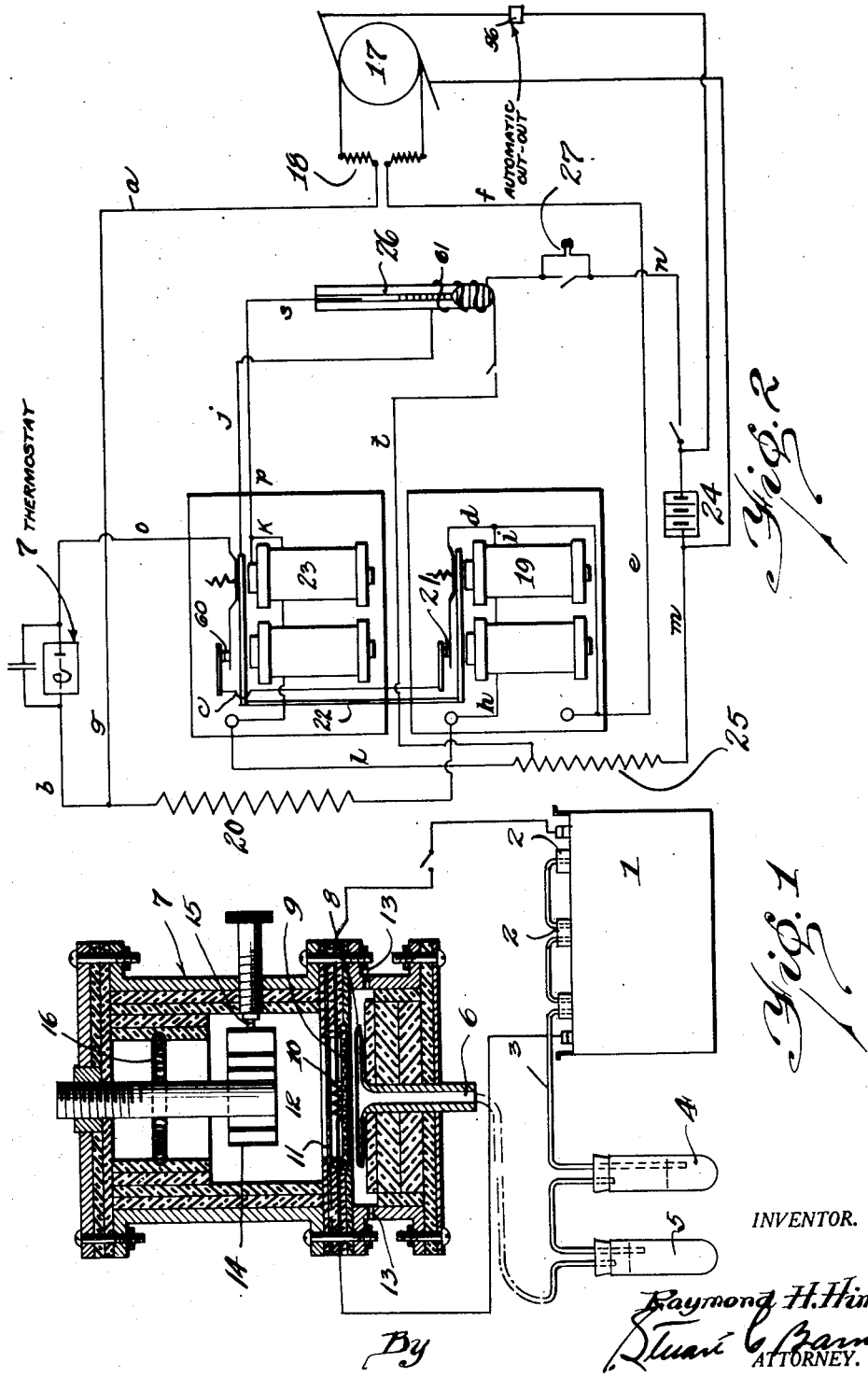
INVENTOR.
Raymond H. Himes
By Stuart C. Barnes
ATTORNEY.

Patented Mar. 12, 1935

1,993,785

UNITED STATES PATENT OFFICE 1,993,785

METHOD OF AND APPARATUS FOR CONTROLLING THE CHARGING OF STORAGE BATTERIES

Raymond H. Himes, Ypsilanti, Mich.

Application April 27, 1929, Serial No. 358,504

10 Claims. (Cl. 171—314)

This invention relates to a method of and apparatus for controlling the charging of storage batteries, and has to do particularly with a novel method of safely and positively controlling the charging of the battery by reason of the gases evolved toward the beginning of the overcharging of the battery.

Many methods and devices have been designed in attempts to overcome the damage to batteries due to overcharging. Some of these attempts have utilized the pressure of the evolved gases to actuate complicated devices, but such structures have necessitated the use of expensive gas-tight compartments. Another method has utilized ampere-hour meters arranged to stop the charging after a definite amount of electrical energy is consumed. Such method is not particularly reliable and, in addition, is very expensive. Still another method has made use of the hydrogen gas evolved during over-charging, such hydrogen gas being caused to impinge against metals such as platinum or palladium in spongy form, whereby the hydrogen is adsorbed or condensed upon the surface of the metal and heat is liberated. This process, however, is a physical process and not a chemical one, and is open to the serious disadvantage in that it is not practical in commercial storage batteries to isolate the hydrogen, nor is it feasible to utilize the hydrogen oxygen mixture because of the extreme danger of an explosion. Furthermore, the cost of the metal required, such as platinum and palladium is a limiting factor and the process is not well adapted for repeated operation because of the tendency of the adsorbed hydrogen to remain in contact with the metal.

It is the object of the present invention to not only make use of the gases evolved toward the beginning of the overcharging of the battery in controlling the charging of the battery, but to make use of such evolved gases by reason of a chemical change or process as distinguished from the pressure system or the adsorption system. More specifically, I make use of the fact that certain proportions of hydrogen and oxygen, which are normally highly explosive in the presence of a spark or sufficient heat, may be safely burned without explosion in the presence of a catalyst. In addition to the novel idea of burning the evolved hydrogen and oxygen gases in the presence of a catalyst, I also make use of the large amount of heat evolved in this burning action by employing the same to actuate a thermostat which in turn operates suitable apparatus designed to positively and accurately regulate the charging process.

In the drawing:

Fig. 1 illustrates one form of apparatus for carrying out my method.

Fig. 2 is a diagrammatic wiring diagram for a motor generator charging system including a time delay device to time the charging of the battery after the overcharging period.

It is well known that when storage batteries are overcharged that hydrogen and oxygen gases are evolved in the form of an explosive mixture so that if a spark or sufficient heat be applied to such mixture it will explode with the formation of steam and the liberation of heat according to the following chemical equation:

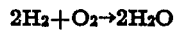
$$2H_2 + O_2 \rightarrow 2H_2O$$

In carrying out my novel method, I make direct use of the hydrogen and oxygen gases evolved before serious overcharging of a battery and burn such evolved gases in the presence of a catalyst which catalyzes the chemical change to positively prevent any explosive action, and I then utilize the heat evolved in the combustion of the hydrogen and oxygen to actuate suitable mechanism to accurately control charging of the battery.

In Fig. 1 I have shown suitable mechanism for carrying out my process wherein a standard battery 1 is shown fitted with gas-tight stoppers 2 and suitable tubing 3 through which hydrogen and oxygen gases may pass when the battery is being overcharged. The slight pressure of these gases is sufficient to pass them through either a fine mesh wire or through suitable solutions 4 and 5, of low freezing point, before passing to the intake 6 of the thermostat control device which may be generally designated 7. The use of such solutions or of a fine mesh wire is a precaution to guard against the flash-back of the burning gases.

The tube 6 for receiving the gases is preferably provided with a flat circular sheet metal top 8 having a plurality of minute perforations. A suitable disc 9 of asbestos or other suitable material containing finely divided platinum, palladium, or other similar catalyst, is positioned above the outlet end of the tube 6 and a small electric heating coil 10 is positioned adjacent such disc so as to keep the disc heated. Only a relatively small current from the battery is required for this purpose and such current may be so connected as to be turned on with the ignition switch.

The gases, upon striking the disc 9 containing the catalytic material, will burn and create a relatively large amount of heat. The heat units so created will pass upwardly through a thin circular sheet of metal 11 and into the chamber 12. The waste gases will pass out through suitable holes 13 on the side of the thermostat housing. The restricted space of the combustion chamber, above the tube 6, is such as to cause dilution of the hydrogen-oxygen mixture by the steam produced, and this fact, as well as the nature of the burner, serves to prevent explosion of the gases.

The instantaneous and large supply of heat units resulting from the burning of the hydrogen and oxygen gases directly affect a thermostat coil 14 of suitable thermostatic metal whereby to break contact with a suitable adjustable contact point 15. The thermostat may be lined with suitable insulating material, as shown, and, if desired, a heating coil 16 may be positioned as shown in Fig. 1, and can be controlled by another thermostat coil (not shown) or used alone, so as to keep the chamber at a temperature within a desirable range of the operating range of the thermostat proper.

In Fig. 2 I have shown a wiring diagram for motor-generator charging systems using the thermostat 7 as shown in Fig. 1. This thermostat is represented at 7 in Fig. 2, and whenever the contacts of such thermostat 7 are closed, normal current flows through the shunt field windings 18 of the generator 17, thus permitting the generator to deliver its normal charging current. The shunt field circuit is extended along the path a, b, c, d, e, f, so that the current therein flows through the contacts of the thermostat 7, the contacts 60, of magnet 23, and the contacts 21 of the magnet 19. When the contacts of the thermostat are open, the shunt field circuit is changed and the current must flow along the path a, g, h, i, e, f, and its value is decreased due to the resistance 20 and the resistance of the magnet 19. Any desired decrease in the current strength of the field of the generator is attained by proper adjustment of the resistance 20. Since the output of the generator 17 varies with the current in its shunt windings, the rate of charging the battery 24, or any suitable number of batteries similarly placed, can either be reduced, or, by use of a standard "cut-out" or under-load relay, 56, can be stopped entirely. Actuation of the magnet 19 will result in opening the contact points 21 so that even if the contacts of the thermostat 7 should close, the current would still pass through the resistance 20.

The magnet 19 is thus energized by the circuit a, g, h, i, e, f, and inasmuch as the armature of the magnet 19 is mechanically connected by means of a link 22 to the armature of the magnet 23, energization of the magnet 19 and movement of its armature will directly cause movement of the armature of coil 23 against its pole piece, and consequent breaking of the contact 60. When all the hand operated switches shown in Fig. 2 are closed, movement of the armature of the magnet 23, as above described, will complete a second circuit through the points j, k, l, m, n, thus causing current to flow from the battery 24 through the lamp 27, heating coil 61, the contact between the armature and pole piece of magnet 23 and the resistance 25. The heating coil 61 is utilized to actuate a time delay device 26 and for lighting a lamp 27 if the switch across the lamp terminals is open.

This time delay device 26 may consist of a glass bulb having a suitable capillary stem filled with mercury. The mercury in the bulb is normally connected in circuit with the wire t which is connected into the line l, m. A suitable wire s is connected into the bulb so as to be contacted by the mercury when the mercury in the stem is heated, thus wire s is connected into the pole piece of the magnet 23 by means of the line p. When current flows through the few turns of wire 61, the mercury is slightly heated, and after a predetermined period of time will short circuit the magnet coils 19 and 23. This deenergization of the coils 19 and 23 takes place because upon completion of the connection between the wires s and t by the mercury, and the thermostat having cooled to close the contacts, the current from the generator will flow through the circuit a, b, o, p, s, t, and m, thus short circuiting or deenergizing the coils 19 and 23 and allowing the armatures to be returned to their normal position and also causing closing of the contacts 60 and 21.

It will thus be seen that when the circuit a, g, h, i, e, f, is once closed, it will remain in operation preventing the generator from charging the battery until said magnet 23 is short circuited by the time delay device as above described, permitting the contacts of the magnets to close, or until the circuit is opened manually by opening the battery and heating coil switches as shown in Fig. 2.

It will thus be seen that in normal operation of this device, the evolved oxygen and hydrogen gases, due to the overcharging of the battery, will be burned in the base of the thermostat due to the catalytic action, and that this burning action will be sufficient to affect the thermostat whereby to throw in a suitable resistance and to temporarily stop or lower the charging rate. The operation of the thermostat will also actuate suitable magnets whereby to place in operation a time delay device which will maintain the known charging circuits for a predetermined time, regardless of the time the thermostat returns to normal position.

It will be understood that where I have referred in the specification and claims to the gases formed toward the beginning of or by the overcharging of the battery, that I am broadly referring to that period at which time the gases begin to form, for the reason that such time of formation of the gases may vary considerably with different installations, different types of batteries, and varying conditions of the battery, particularly as to age.

What I claim is:

1. In a storage battery control system of the type wherein the gases formed by overcharging are utilized to temporarily stop further charging, a charging circuit, means for heating the gases and catalyzing the union of said gases to cause burning, and means utilizing the heat evolved from said burning to control the charging of the battery.

2. In a storage battery control system of the type wherein the gases formed by overcharging are utilized to temporarily stop further charging, a charging circuit, means for subjecting the oxygen and hydrogen gases to heat and catalyzing the union of said gases to cause burning and means for utilizing the heat evolved from said burning to control the charging of the battery.

3. In a storage battery control system of the type wherein the gases formed by overcharging are utilized to control further charging, a battery charging circuit, means for controlling the battery charging circuit by means initiated by the chemical union of the gases evolved from overcharging of the battery and means for maintaining said control of said charging circuit for a predetermined length of time independently of said initiating means.

4. In a storage battery control system of the type wherein the gases formed by overcharging are utilized to control further charging, a battery charging circuit, means for catalyzing the burning of gases evolved due to the overcharging, means utilizing heat evolved from the burning of the gases to initially lower the charging rate of the system, and means for maintaining such lowered charging rate for a predetermined length of time.

5. In a storage battery control system of the type wherein the gases formed by overcharging are utilized to control further charging, a battery charging circuit, means for heating and catalyzing the burning of gases evolved due to the overcharging, means actuated by heat evolved from the burning of the gases to initially lower the charging rate of the system, and means for maintaining such lowered charging rate for a predetermined length of time, independently of said initiating step.

6. Storage battery control means comprising in combination with a battery and its charging circuit, a thermostat actuated by the heat of combustion of gases evolved from the battery to control the flow of current in the charging circuit and means initiated by said thermostat for regulating the length of time before said current returns to its normal charging value.

7. A storage battery control system comprising in combination a battery and its charging circuit, a thermostat, means for conducting any gases evolved by the overcharging of the battery to said thermostat, means for heating said gases in the presence of a catalytic agent which catalyzes the burning of the gases, and means actuated by heating of the thermostat for regulating the value of the charging current.

8. A storage battery control system comprising in combination a battery and its charging circuit, a thermostat, means for conducting any gases evolved by the overcharging of the battery to the base of said thermostat, means for heating said gases in the presence of a catalytic agent which catalyzes the burning of the gases, means actuated by heating of the thermostat for regulating the value of the charging current, and means actuated by said last named means for controlling the length of time of each regulation in the value of the charging current.

9. A storage battery control mechanism comprising in combination with a battery and its charging circuit, of a thermostat, means for conducting the oxygen and hydrogen gases resulting from overcharging of the battery to the thermostat, means for catalyzing the joining of the hydrogen and oxygen to cause burning of the same to actuate the thermostat, means initiated by the actuation of the thermostat for lowering the value of the charging current and means actuated by said last named means for controlling the length of time of said change in the charging current.

10. A storage battery control system comprising in combination a battery, a charging circuit, means for chemically combining hydrogen and oxygen evolved from overcharging of the battery to form heat, and means actuated by the creation of said heat to control said charging circuit.

RAYMOND H. HIMES.